Aug. 30, 1955  A. B. SKROMME  2,716,318
CROP PICKUP, COMPRESSER AND CUTTER
Filed Jan. 4, 1954  3 Sheets-Sheet 3

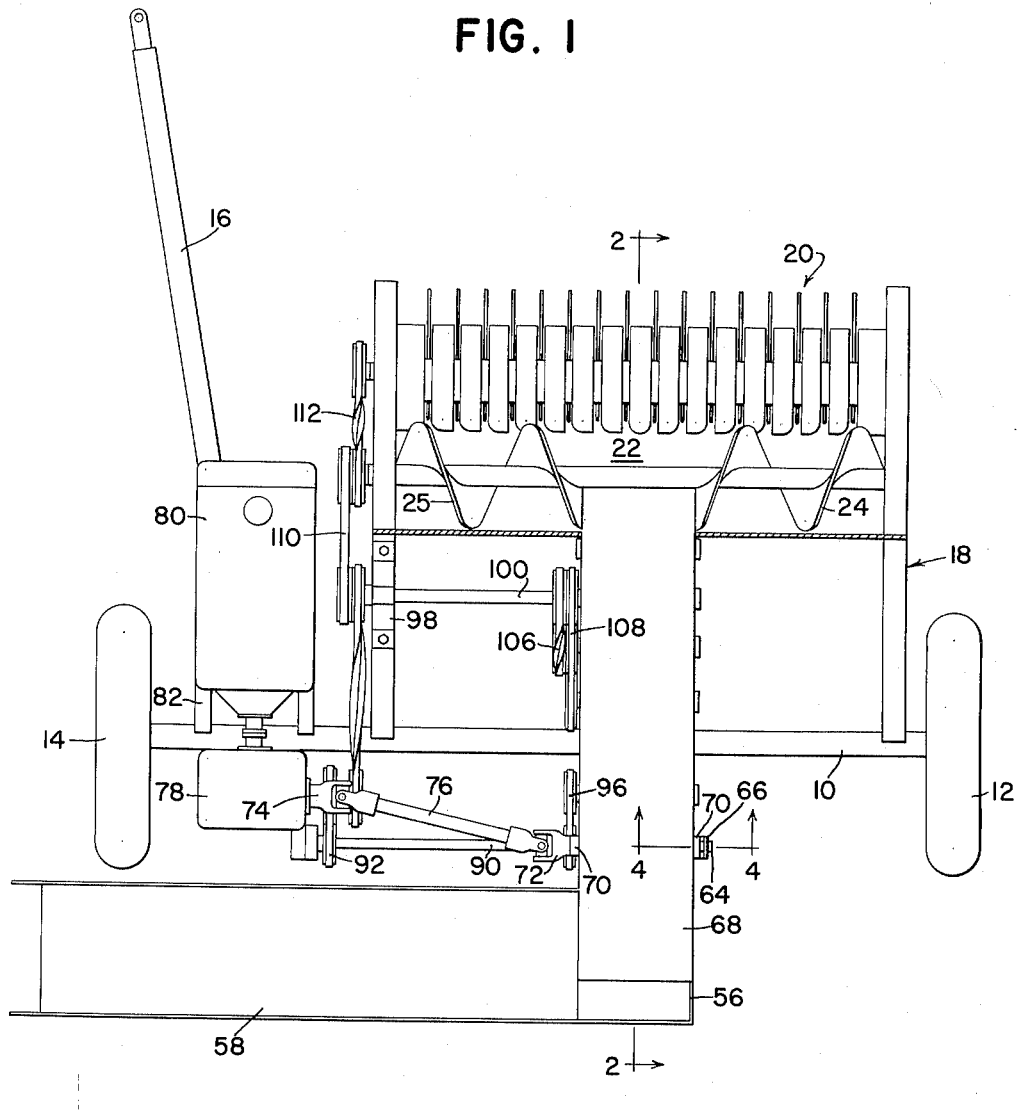

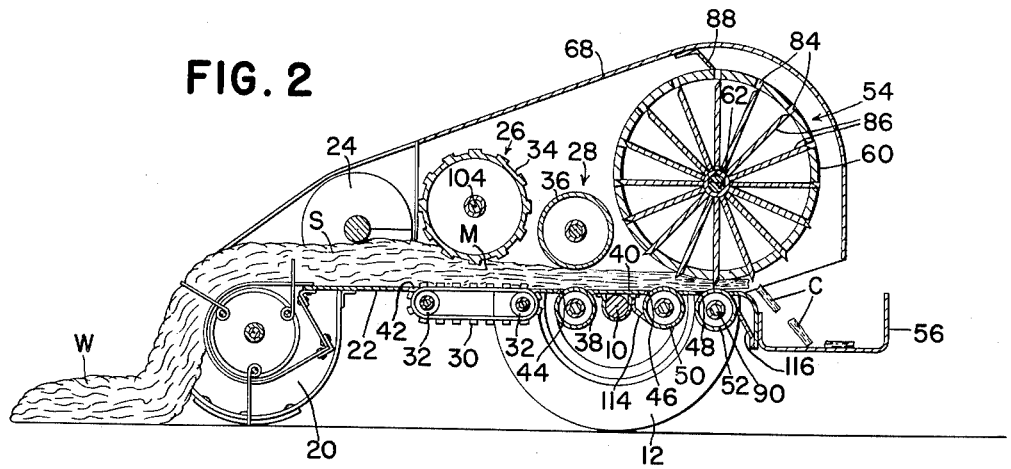
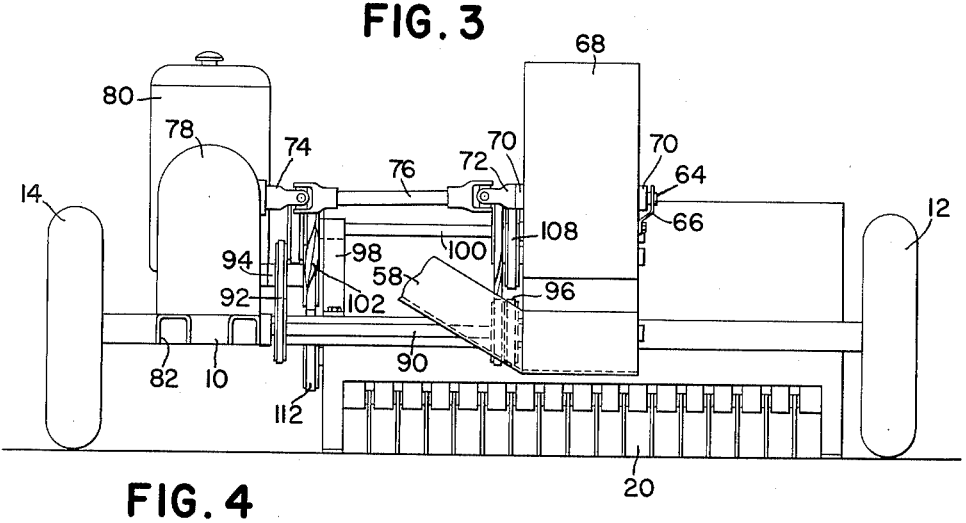
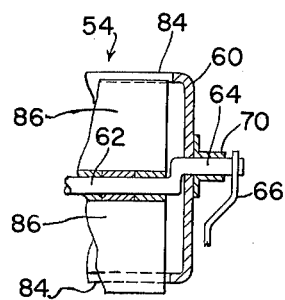

INVENTOR.
A. B. SKROMME
ATTORNEYS

United States Patent Office 2,716,318
Patented Aug. 30, 1955

2,716,318

CROP PICKUP, COMPRESSER AND CUTTER

Arnold B. Skromme, Ottumwa, Iowa, assignor to Deere Manufacturing Co., Dubuque, Iowa, a corporation of Iowa Application January 4, 1954, Serial No. 401,931

11 Claims. (Cl. 56—1)

This invention relates to an agricultural machine and more particularly to a machine for gathering crops such as hay and the like and for forming these crops into relatively small and compacted components for use as animal feed.

It is known, of course, to gather hay crops by means of a pickup baler, which operates to form the crops into bales of appreciable size, weighing on the order of from sixty to one hundred pounds. Before these bales can be fed to animals, they must be cut apart or broken up into feeding portions. Before that, however, the tying medium with which they are bound, such as wire or twine, must first be severed and disposed of. Although these relatively large bales are quite convenient to handle for purposes of shipment, they present storage and feeding problems in the hands of the individual livestock feeder. According to the present invention, these disadvantages are eliminated by the provision of a machine that forms the collected crops into relatively small cakes or pellets.

One of the principal objects of the invention is to afford a machine that utilizes pressure to intensify the coherency of a crop stream so that the stream is formed into a relatively thin mat, which may be simultaneously or subsequently cut into cakes or pellets of quite small size. Of course, the size can be varied according to the nature and type of the animals to be fed. In the instance of cattle, each cake may be made the size of a cud, which is not only palatable but also convenient for the animal. In the formation of the cakes or pellets, it is an object to utilize relatively high pressures for compacting the collected crops into a relatively thin mat, preferably by subjecting the crop stream to a series of sets of successive pressure devices, each exerting progressively increasing pressures, so that the mat or sheet formed thereby may be readily cut into the small cakes or pellets. Because of the pressures employed the intensified coherency of the material is such that the mat, and even the cut components thereof, is self-contained, requiring no extraneous tying medium such as wire, twine, etc. Further features of the invention reside in rotary cutting means, which may serve as additional pressure means and which may take any one of the various forms illustrated.

The foregoing and other important objects and desirable features inherent in and encompassed by the invention will become apparent to those versed in the art as the invention and various forms thereof are disclosed in the following detailed description and accompanying sheets of drawings, the figures of which will be described immediately below.

Fig. 1 is a plan view of the cake- or pellet-forming machine with parts broken away and shown in section.

Fig. 2 is a longitudinal sectional view of the machine as seen substantially along the line 2—2 of Fig. 1.

Fig. 3 is a rear elevational view of the machine.

Fig. 4 is a fragmentary sectional view, as seen substantially along the line 4—4 of Fig. 1 with the housing omitted.

Figure 5:
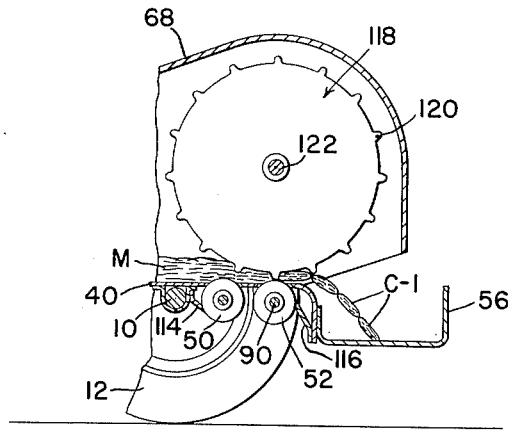
Fig. 5 is a fragmentary view of the rear portion of the machine appearing in Fig. 2, but equipped with a different form of cutter.

The machine is mobile and comprises support means including a transverse axle 10 carried on right- and left-hand wheel 12 and 14 and including a forwardly extending draft tongue 16 by means of which the machine may be connected to a tractor or other suitable vehicle (not shown) for transport over the field. The machine is equipped between the right- and left-hand wheels 12 and 14 with auxiliary supporting structure, designated generally by the numeral 18, having at its forward end a transverse pickup means 20 of a type not unknown in pickup balers and forage harvesters. The pickup mechanism shown represents but one of various types of gathering means usable for initially collecting the crops from the ground, on which they may lie in a previously formed windrow W (Fig. 2) or from which they may be cut in a simultaneous operation. The pickup means 20 transfers the crops upwardly and rearwardly onto a deck 22 over which is operative means for compressing the collected crops laterally into a crop stream S materially narrower than the pickup 20, which means may take the form of right- and left-hand augers 24 and 25, past which the stream S moves rearwardly through successive sets of compressing elements or devices 26 and 28. The forward one of these devices comprises a lower rotary device 30 in the form of an endless fore-and-aft running conveyor trained about a pair of rollers 32, one of which may be driven. The upper device of the set 26 comprises a ribbed, relatively large roll 34 spaced just above the upper run of the conveyor 30 so that, as the crop stream S is moved rearwardly between the conveyor 30 and roll 34, the stream is compressed vertically into a relatively thin mat or sheet-like structure M, the stream having already been laterally narrowed by the augers 24 and 25.

The second set of devices comprises upper and lower rolls 36 and 38, between which the mat M passes in its rearward travel from the deck 22 and a deck extension 40, the deck extension being appropriately apertured as at 42, 44, 46 and 48 to receive not only the conveyor 30 and the lower roll 38 but additional rolls 50 and 52, the purposes of which will presently appear. The vertical spacing between the rolls 36 and 38 is less than that between the roll 34 and conveyor 30, so that the pressure on the mat is progressively increased, it being understood that the positions of the rolls 34 and 36 relative to their cooperating devices 30 and 38 may be adjustable as well as spring-loaded, which details will readily appear to those versed in the art. As the mat is thinned out and compacted by the successive devices 26 and 28, it continues over the deck extension 40 and onto the rolls 50 and 52, at least the latter of which comprises means for backing up the mat in cooperation with cutting means such as designated generally by the numeral 54. This means operates to further compress the mat and also to cut the mat into a plurality of relatively small cakes or pellets C, and these cakes or pellets drop into a trough 56 carried at the rear of the machine. As shown in Figs. 1 and 3, the trough 56 may lead to an upwardly and leftwardly inclined conveyor 58 for transfer of the cakes or pellets to a convenient receptacle (not shown), any kind of which may be used without affecting the nature of the invention.

The rotary cutting means shown in Fig. 2 and forming part of the structure shown in Figs. 1, 3 and 4 comprises a drum 60 journaled at opposite ends on a transverse axis parallel to and above the backing means or lower rolls 52.

Within the drum is a crankshaft 62 eccentric and parallel to the drum axis and having cranked end portions (one of which is shown at 64 in Fig. 4) fixed or held against rotation, as by means 66 secured to the side wall portions of a general enclosure 68 that covers the devices or elements 26, 28 and 54 from above and at both sides.

Although the shaft 62 is fixed, the drum 60 is rotatable, having at each end appropriate bearings such as those suggested at 70. The drum is power driven by means of an input shaft 72 connected to the drum in any suitable manner and connected to a drive shaft 74 by an intermediate flexible shaft 76. The drive shaft 74 extends from a suitable gear casing 78 to which power is supplied by a power source such as an internal combustion engine 80 carried on a subframe 82 forming part of the support means comprising the axle 10 and wheels 12 and 14.

The cylindrical surface of the drum constitutes a peripheral wall provided with a plurality of uniformly angularly spaced perforations or slots 84 through which cutters or blades 86 are adapted to be successively projected and retracted. The blades are all of the same length and are pivotally connected to the shaft 62 and radiate therefrom in alinement respectively with the perforations 84. The pivotal connections of the inner ends of the blades 86 are in the nature of a multiple piano hinge, but any other suitable arrangement may be used. The eccentricity of the shaft 62 relative to the axis of the drum 60 is such that the shaft 62 is below the axis of the drum; therefore, the blades 86 will be projected through the perforations 84 in the lower phase of rotation of the drum. Consequently, the points or cutting edges of the blades 86 will cut the mat into the cakes C as the mat is passing over the backing roll 52. During the upward phase of rotation of the drum 60, the teeth will be retracted, thus producing a stripping action so that the tendency of the cakes C to adhere to the drum surface is minimized. In the event that the cakes are not dislodged by the stripping action just referred to, the enclosure 68 carries just above the drum a scraper or stripper 88 which serves not only to remove adhering cakes but also to scrape the surface of the drum and keep it clean from accumulated juices that may be expressed from the crop as the mat is formed.

The lower roll 52 is carried on a shaft 90 driven by a belt 92 from a power shaft 94 projecting from the gear casing 78. The roll 50 may be driven from the shaft 90 by means of a belt 96. The supporting means comprising the axle 10 and wheels 12 and 14 carries a suitable bearing 98 in which is journaled a floating shaft 100 driven at one end by a belt 102 from the gear case shaft 94 and connected at its other end to a coaxial shaft 104 on which the upper front device or roll 34 is mounted. The conveyor 30 may be driven from the shaft 100 by means of a belt 106. The rolls 34 and 36 may be suitably driven from the shaft 100 as by a belt 108.

The left-hand end of the shaft 100 serves also as means from which power may be taken to drive the augers 24 and 25 and pickup means 20, belts 110 and 112 being shown as representative drive means for these purposes.

In operation, the machine shown in Figs. 1, 2, 3 and 4 is drawn over the field in any suitable manner, the pickup means 20 operating to pick up windrowed crops as at W and to transfer these crops rearwardly into the rearwardly moving crop stream S, which stream is laterally narrowed by the action of the lateral compressing means or augers 24 and 25. As the stream S continues to move rearwardly, it is subjected to vertical pressure first by the device 26 and then by the device 28, after which it passes over the rolls 50 and 52 to be further compressed and cut by the radially projecting cutters or blades 86 of the rotary cutter element 54. The surface of the drum 60 is spaced above the roll 52 a distance less than the vertical spacing between the rolls 36 and 38 of the device 28, and may be spring-loaded or otherwise forcibly urged downwardly, thus further subjecting the mat to compression or compacting pressure, preferably a unit pressure on the order of 600–900 p. s. i. As already indicated, the cakes when cut from the mat are discharged at C into the trough 56.

Suitable scrapers 114 and 116 are provided for keeping the rolls 50 and 52 clean.

The modification shown in Fig. 5 may embody the main characteristics of the machine shown in Figs. 1, 2, 3 and 4, with the exception of a change in the basic cutter element. The cutter element shown in Fig. 5 is designated in its entirety by the numeral 118 and comprises a drum having thereon a plurality of ribs or cutters 120 occupying fixed positions relative to the drum; that is to say, they are not retractable and extendible as are those in Fig. 2. To the extent that the characteristics of the machines are the same, reference characters already used have been employed. The drum 118 is mounted on a transverse shaft 122 which is driven, as is the drum 60, from the shafting 72—74—76.

In this form of the invention, the mat is shown as being incompletely cut so that the cakes $C^1$ are joined together by relatively thin mat portions, in the nature of links. In handling or feeding cakes or pellets of this type, one or more of the cakes may be easily separated from the remainder of the mat.

Figure 6:
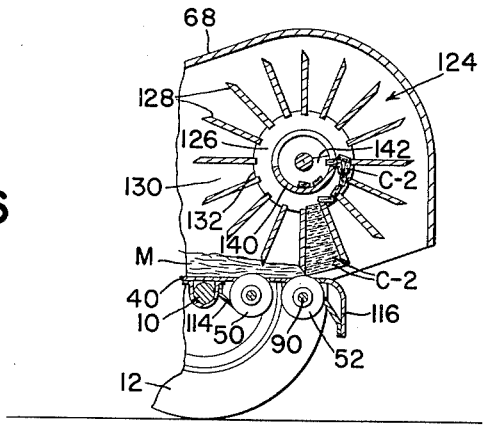
Fig. 6 is a similar view showing still another form of cutter.

In Fig. 6, a still different form of cutter, designated generally by the numeral 124, is substituted for those previously described. This device comprises a central hollow core 126 from which a plurality of uniformly angularly spaced blades or cutters 128 radiate. Because of this mounting of the blades or cutters, each blade and its neighbor will define therebetween a pocket 130 converging toward the core 126 and opening at 132 into the core 126. As the device or means 124 rotates to cooperate with the roll 52 for cutting the mat into cakes or pellets $C^2$, successive cakes will accumulate between each blade and its neighboring blade in magazine fashion until ultimately the cakes are ejected into the core 126. The convergence of the blades and neighboring blades constitutes means for further restricting the cakes $C^2$ as they accumulate between the blades.

As the device 124 rotates, the cakes or pellets ejected within the core 126 are carried upwardly and then dropped into a coaxial trough 140 which forms part of conveyor means including a rotatable auger 142. The conveyor means operates to convey the ejected cakes axially for discharge at one side of the machine.

Figure 7:
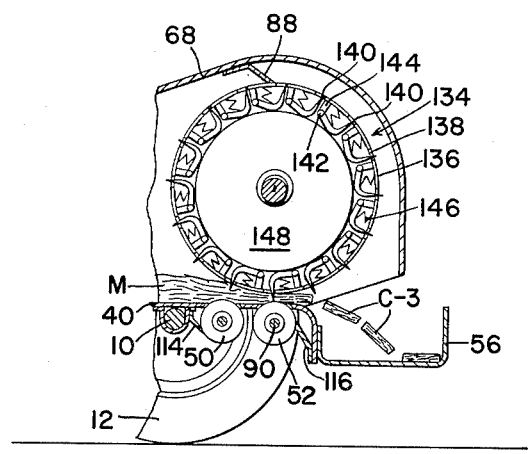
Fig. 7 is another view of like nature showing a further modified form of cutter.

In the modification shown in Fig. 7, a rotary device or cutter element 134 replaces those previously described. This device comprises a drum 136 having an annular wall formed with a plurality of uniformly angularly spaced perforations or slots 138 through which a plurality of cutters or blades 140 are adapted respectively to project as the device rotates. Each cutter 140 is pivotally mounted at 142 on an internal bracket 144 carried by the drum. Each blade is biased by a compression spring 146 for inward radial movement, but the cutters or blades are successively projected through their respective openings by means comprising a cam 148 arranged eccentrically within the drum 136. The arrangement is such that the blades are projected during the lowermost phase of rotation thereof and are retracted by the biasing means or springs 146 during the upper phase of rotation. Hence, the cutters or blades are projected during that portion of rotation of the device 134 in which the cakes $C^3$ are formed, and the blades subsequently retract within the drum to achieve the stripping action described above in connection with Fig. 2.

The operation of the machine suggested in Figs. 5, 6 and 7 is deemed to be clear from the description of the operation of the machine as referred to in the description of Figs. 1, 2, 3 and 4.

Various specific features of the invention not categorically enumerated herein will undoubtedly occur to those versed in the art, as will many modifications and alterations in the preferred embodiments of the invention illustrated, all of which may be achieved without departing from the spirit and scope of the invention.

What is claimed is:

1. An agricultural machine of the character described, comprising: fore-and-aft support means having thereon means for receiving crops such as hay and the like; means movable rearwardly on the support means for moving such crops rearwardly in a crop stream; crop-compressing means on the support means for compressing the stream into a relatively highly compressed, self-contained mat and for moving the mat further rearwardly; means on the support means over which the mat is moved by the compressing means and including means backing up one side of the mat; and a rotary element carried by the support means in parallelism with the backing means but at the other side of the mat, said element having thereon a plurality of uniformly angularly spaced cutter blades movable successively toward the backed up mat as the element rotates, said blades successively cutting the backed up mat into relatively small cakes; and means on the support means for conveying the cakes to a point of discharge.

2. The invention defined in claim 1, in which: the rotary element comprises a drum rotatable about an axis spaced from the backing means such that the cylindrical surface of the drum runs in closely spaced relation to the backing means; and the cutter blades, at least in the zone of engagement with the backed up mat, project radially beyond the drum surface a distance on the order of the spacing between the drum surface and the backing means.

3. The invention defined in claim 2, in which: the drum surface is perforated; the cutter blades are movably mounted within the drum for projection and retraction radially outwardly and inwardly respectively through the perforations; and means is provided within the drum and engaging the blades for projecting successive blades as they approach the mat and for retracting successive blades as they leave the mat during rotation of the drum.

4. The invention defined in claim 2, in which: the drum surface is perforated; a shaft is disposed within the drum on an axis parallel and eccentric to the drum axis in the direction toward the backing means and is fixed against rotation relative to the drum; and the blades are pivotally connected at their inner ends to the shaft and extend radially from said shaft to be successively projected radially outwardly or retracted radially inwardly through the perforations as the drum rotates.

5. The invention defined in claim 2, in which: the drum surface is perforated; the cutter blades are carried by and within the drum for movement relative to the drum to be projected radially outwardly and retracted radially inwardly respectively through the perforations; the blades are biased for retraction; and cam means is arranged within the drum and engaging the blades so as to cause successive projection of the blades as they approach the backed up mat.

6. The invention defined in claim 1, in which: the rotary element comprises a central hollow core; the blades are fixed to the core and project radially therefrom in uniformly angularly spaced relation so that each blade and its neighbor define a pocket converging radially inwardly to the core, each pocket opening to the core; and said neighboring blades are operative to cut and retain cakes and to accumulate cakes therein in magazine fashion as the element rotates, said accumulating cakes being additionally compressed by the neighboring converging blades as such cakes are forced radially inwardly by succeeding cakes until radially innermost cakes are successively discharged into the hollow core.

7. The invention defined in claim 6, in which: the means for conveying the cakes to a point of discharge comprises a conveyor means within the hollow core.

8. The invention defined in claim 7, in which: the conveyor means comprises an auger concentrically contained within the core.

9. The invention defined in claim 1, in which: the backing means comprises a compression roller between which and the rotary element the mat is further compressed while being cut.

10. An agricultural machine of the character described, comprising: fore-and-aft support means having thereon means for receiving crops such as hay and the like; means movable rearwardly on the support means for moving such crops rearwardly in a crop stream; crop-compressing means on the support means for compressing the stream into a relatively highly compressed, self-contained mat and for moving the mat further rearwardly, including a series of fore-and-aft spaced sets of rotary devices, each set having cooperating devices spaced apart respectively at opposite sides of the crop stream, the spacing between the devices of rearward sets being progressively less than that between devices of forward sets to progressively increase pressure on the mat; means on the support means over which the mat is moved by the compressing means and including means backing up one side of the mat; means on the support means at the rear of the compressing means and cooperative with the backing means for cutting the backed up mat into relatively small cakes; and means on the support means for conveying the cakes to a point of discharge.

11. The invention defined in claim 10, in which: at least one of the rotary devices comprises an endless fore-and-aft running conveyor.

References Cited in the file of this patent

UNITED STATES PATENTS

| 180,789 | Quesada | Aug. 8, 1876 |
| 199,394 | Aldrich | Jan. 22, 1878 |
| 204,757 | Price | June 11, 1878 |
| 485,483 | Abojador | Nov. 1, 1892 |
| 1,991,033 | Steinwand | Feb. 12, 1935 |
| 2,674,839 | Russell | Apr. 13, 1954 |